United States Patent
Taylor

(10) Patent No.: US 7,526,811 B1
(45) Date of Patent: Apr. 28, 2009

(54) METHODS FOR DETECTING EXECUTABLE CODE WHICH HAS BEEN ALTERED

(75) Inventor: Neil W. Taylor, Springville, UT (US)

(73) Assignee: Novell, Inc., Provo, UT (US)

( * ) Notice: Subject to any disclaimer, the term of this patent is extended or adjusted under 35 U.S.C. 154(b) by 1770 days.

(21) Appl. No.: 09/862,828

(22) Filed: May 22, 2001

(51) Int. Cl.
*H04L 9/32* (2006.01)
(52) U.S. Cl. .......................................... 726/26; 726/27
(58) Field of Classification Search ................. 713/200, 713/176, 164, 187; 726/26–30; 705/57–59
See application file for complete search history.

(56) References Cited

U.S. PATENT DOCUMENTS

| | | | |
|---|---|---|---|
| 5,442,645 A * | 8/1995 | Ugon et al. ................. 714/736 |
| 5,493,649 A * | 2/1996 | Slivka et al. ................. 714/48 |
| 5,892,904 A * | 4/1999 | Atkinson et al. ............ 713/201 |
| 5,944,821 A * | 8/1999 | Angelo ........................ 713/200 |
| 5,991,774 A * | 11/1999 | Tate et al. ................... 707/203 |
| 6,006,328 A * | 12/1999 | Drake ......................... 713/200 |
| 6,188,995 B1 | 2/2001 | Garst et al. |
| 6,189,146 B1 | 2/2001 | Misra et al. |
| 6,195,767 B1 | 2/2001 | Adams |
| 6,199,178 B1 | 3/2001 | Schneider |
| 6,202,924 B1 * | 3/2001 | Saunders .................... 235/379 |
| 6,694,434 B1 * | 2/2004 | McGee et al. .............. 713/189 |
| 6,742,121 B1 * | 5/2004 | Safadi ........................ 713/187 |
| 6,748,538 B1 * | 6/2004 | Chan et al. ................. 713/200 |
| 2003/0014639 A1 * | 1/2003 | Jackson et al. ............. 713/181 |

* cited by examiner

*Primary Examiner*—Hosuk Song
(74) *Attorney, Agent, or Firm*—King & Schickli, PLLC

(57) ABSTRACT

Methods of detecting executable code which has been altered are provided. Upon an initial loading of an executable code a calculation is performed to generate a score associated with the executable code, the initial score is retained. Subsequently, one or more additional calculations are performed on the executable code to generate subsequent scores. Any subsequent score not matching the initial score indicates the executable code has been altered in some way. If alteration has occurred, then the executable code is partially or completely disabled and optionally unloaded from the operating system within which it resides. Moreover, an owner associated with the altered executable code may be notified, or other events may be triggered as a result of scores which when compared are not equal. Calculations may be performed on the executable code randomly, at pre-defined intervals, or upon a specific request.

19 Claims, 3 Drawing Sheets

METHODS FOR DETECTING EXECUTABLE CODE WHICH HAS BEEN ALTERED

FIELD OF THE INVENTION

The present invention relates to methods for detecting executable code which has been altered.

BACKGROUND OF THE INVENTION

Providing secure software in today's existing distributed computing environment is a major problem for software development vendors. Experienced hackers can intercept the distribution or the installation of otherwise secure software and alter its performance in some way Alterations may include, by way of example only, the bypassing of automatic licensing checks, the insertion of malicious computer viruses, and others.

Software vendors have reacted by trying to prevent alterations in a variety of ways, such as distributing the software in executable format, encrypting installation dates which are checked by the software upon execution against an expiration date associated with a license agreement, password protecting the installation and/or execution of the software, and others. Yet, hackers have become extremely adept and are now capable of tracing the executable code to a particular point in the execution sequence and modifying return values located in the executable code which effectively bypass or alter many of the checks installed by the vendors. Furthermore, by altering the executable code to effectively bypass various required checks, hackers are able to bypass the validation of encrypted dates and any requisite passwords, thereby allowing unfettered execution of the software without being subject to any licensing limitations imposed by the software vendor. Moreover, once the software has been modified the hackers can create a permanent fix by patching the operating system or the executable code itself and then reinstalling the software on the operating system.

Further, some operating system vendors have attempted to install checks within the operating system itself to validate that software provided by the vendor is in fact secure. However, this has proved problematic since upgrades and new releases of software often require a user to get frequent patches and updates to the operating system from the vendor. This becomes frustrating to the user, and often if the user neglects to obtain the requisite patch and attempts to run new software, the new software cannot be validated, thereby creating potential security breaches in the operating system. Moreover, hackers have developed fixes which include modifying the software associated with the operating system itself to overcome these lower level checks instituted by the vendors.

Also, many of today's adept programmers have developed techniques to alter the operation of an executable, by modifying the image of the executable which is resident in the memory of the operating system. In this way, any checks being performed upon initiation, or even later, of the executable are bypassed altogether, since initiation has concluded once the image is fully resident in the operating system. This allows programmers to alter the image of the executable without detection. Yet, if the operating system is restarted, such as with a reboot operation or other operations, the original unaltered image of the executable will be fully restored and the programmer will again have to alter this image to achieve his/her desired result.

Of course, a hacker may actually create a separate piece of software which would modify the image of the executable code in memory such that any self-checking code is automatically disabled by the separate piece of software. In such a scenario, this would assist the hacker in defeating checks performed after the executable initially begins execution, or during any runtime checks which the executable may perform.

In today's distributed computing environment where access is in theory available to the entire world nearly instantaneously, a hacker's modification to a vendor's software may permit global unauthorized use of the vendor's software. This creates an incentive to not purchase a valid copy of the vendor's software and may substantially impact the overall viability of the vendor's product in the marketplace. Furthermore, as more and more unauthorized versions become available the likelihood of malicious modifications becomes more frequent which could impact the reputation of the vendor in the marketplace for all the vendor's products. Further, the vendor often finds itself expending unnecessary human resources in addressing problems associated with unauthorized modifications to its software, since support staff may be contacted by users of unauthorized versions of the software for assistance with problems. Accordingly, the ability to ensure software provided by a vendor is secure and reliable is of paramount importance in today's global access computing environment which is presently being fueled by the pervasiveness of the Internet and the World Wide Web (WWW).

SUMMARY OF THE INVENTION

Accordingly, an aspect of the invention is to provide methods of detecting executable code which has been altered while in memory. By performing a calculation against the executable image (e.g., code and data) during the initial loading of the executable code to an operating system to generate an initial score, and by performing subsequent calculations to generate subsequent scores associated with the executable image, a determination may be made as to whether the executable code has been altered. The initial score may be compared to subsequent computed scores randomly, periodically, or by manual selection of a user. A user may include any entity represented by the operating system, which by way of example only, includes a mouse selected option by an end user or another executable code requesting scores to be compared at any particular point in time.

As one skilled in the art will readily appreciate, subsequently compared scores to the initial score allows a software vendor to ensure that the current executable code (e.g., program instructions and data used by the instructions) residing in the resident memory of the operating system is the correct image of the executable code, as it was originally loaded or presented to the operating system. Moreover, the software vendor may ensure that any executable code which is subsequently modified and saved cannot be reloaded since the reloaded executable code will be associated with a different score than the originally loaded score. In this way, the software distributed and being supported by the software vendor may be continually validated for authenticity and alterations are detectable and reportable to the software vendor.

Additional aspects, advantages and novel features of the invention will be set forth in the description that follows and, in part, will become apparent to those skilled in the art upon examining or practicing the invention. The aspects and advantages of the invention may be realized and obtained by means of the instrumentalities and combinations particularly pointed out in the appended claims. To achieve the foregoing and other aspects and in accordance with the purpose of the present invention, methods of detecting executable code which has been altered are provided.

A method of validating executable code resident in an operating system having executable instructions is provided, comprising receiving a score associated with an executable code when the executable code is initially loading into an operating system, wherein the score is saved. Further, a subsequent score is received which is associated with the executable code and the subsequent score is compared to the initial score to determine if the executable code has been altered.

Furthermore, a method of disabling executable code which has been modified without authorization having executable instructions is provided, comprising receiving a score associated with an executable code and receiving one or more subsequent scores associated with the executable code. Moreover, the executable code is disabled if the initial score is not equal to any of the subsequent scores.

Finally, a method of authenticating executable code resident in a memory having executable instructions is provided, comprising acquiring a score associated with an executable code which was established when the executable code was first loaded into a memory of an operating system. Next, a subsequent score associated with the executable code is received while the executable code is in the memory and the subsequent score is compared to the initial score.

Still other aspects of the present invention will become apparent to those skilled in the art from the following description of an exemplary embodiment, which is by way of illustration, one of the exemplary modes contemplated for carrying out the invention. As will be realized, the invention is capable of other different and obvious aspects, all without departing from the invention. Accordingly, the drawings and descriptions are illustrative in nature and not restrictive.

BRIEF DESCRIPTION OF THE DRAWINGS

The accompanying drawings, incorporated in and forming part of the specification, illustrate several aspects of the present invention and, together with their descriptions, serve to explain the principles of the invention. In the drawings.

DETAILED DESCRIPTION

Figure 1:
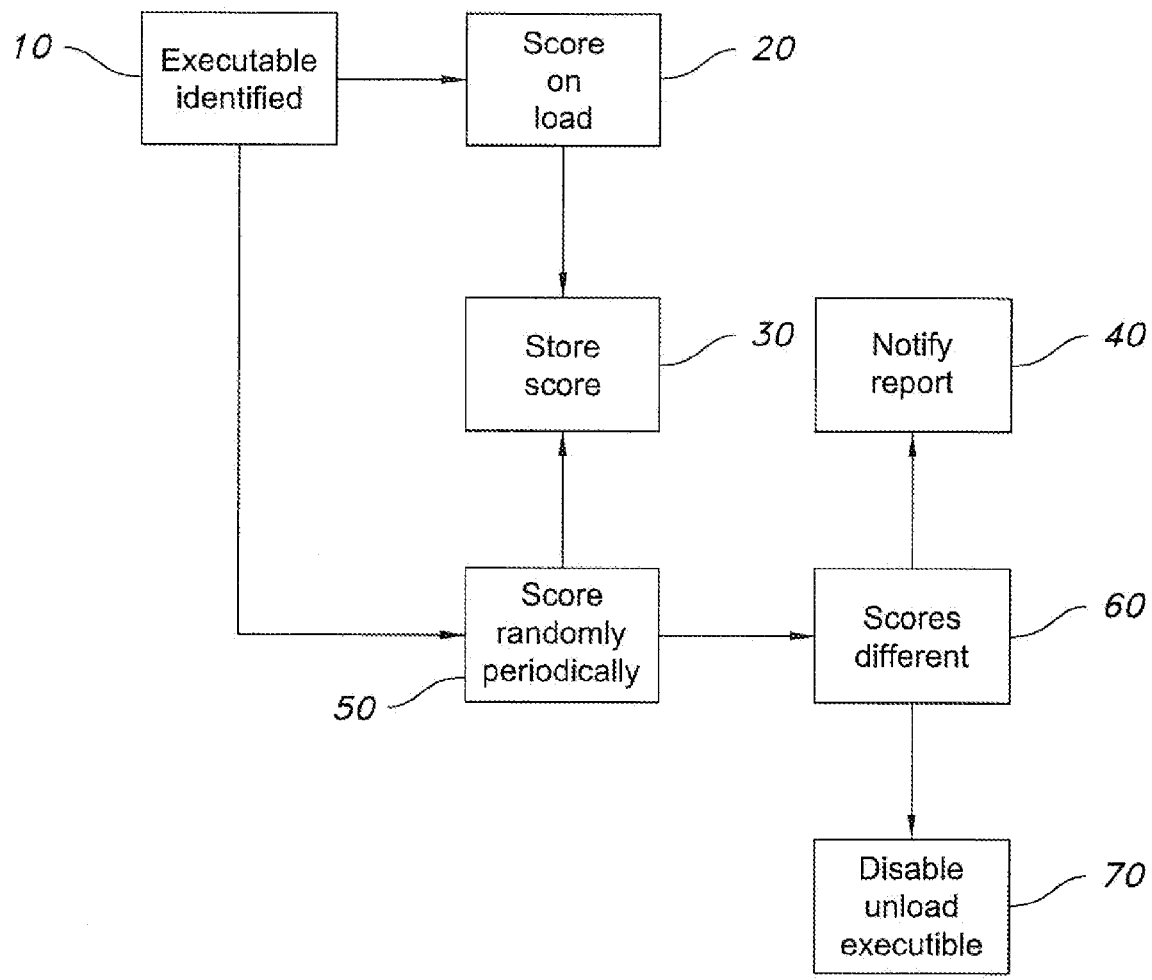
FIG. 1 depicts a flow diagram of a method for validating executable code.

The present invention provides methods for detecting executable code which has been altered. One embodiment of the present invention is implemented in NOVELL's NetWare operating system environment using the C or C++ programming language. Of course other operating systems, and programming languages (now known or hereafter developed) may also be readily employed.

Software is developed, distributed, and executed in a variety of different formats. Typically, software is distributed to consumers by vendors in an executable form or binary form. The executable form is also the format required to run the software on a computing device. The source form of the software is often not distributed or made available to the consumer, as this is in a human readable format which is used in developing the software, and making it available would allow even the most novice programmer to substantially modify the software and create an infinite number of executable forms of the software.

The industry refers to the source form of the software as the source code, while the executable or binary form of the software is often referred to as the executable code or binary code. A compiler will translate a source code into an executable code. As will be readily apparent to those skilled in the art, modifications to the source may result in permitting the derivative forms of the source to perform differently than what was originally intended by the software vendor. Moreover, although modifications to the executable or binary form of the source is more difficult, it is still, nevertheless, a real threat.

Moreover, executable code is not usually readable to humans, although some adept programmers have developed methods of reading and understanding at least some portions of the executable code. By understanding the execution sequence and key portions of the executable code, programmers have been able to modify the executable code to cause the software to perform in a way that is not consistent with how the software is intended to function. For example, alteration of the execution sequence may permit one to bypass important licensing aspects of the vendor's products. Furthermore, some malicious programmers make alterations by inserting computer viruses into the executable code, which may substantially damage the reputation of the vendor and potentially damage non vendor software on a consumer's computing device. As a result, most attempts made by vendors to protect licensing, copyright, trademark, and other rights have been circumvented by programmers with the skill to trace and modify the executable code, which is distributed with the software product by the vendor.

Furthermore, often software which is to be installed on a computing device is packaged in installation scripts, which permit the automatic installation of the executable code to the operating system of a consumer's computing device. Often, the installation scripts will ensure that the requisite directories and files are present for the proper execution of the executable code. Moreover, these installation scripts often register the executable code with the operating system such that each time the operating system is initiated, the executable code is loaded into the resident memory of the operating system and thereby made available for execution by the consumer or some other program on the computing device.

In an exemplary embodiment of the present invention, the software is compiled into an executable form, and the executable form of the software is then distributed in whatever manner desired by the software vendor, such as by way of example only, direct download, on a separate computer readable medium for installation, and others. Although as one skilled in the art will appreciate, the software may also be distributed in an encrypted format, or in a source code format, and other formats without detracting from the present invention. Moreover, the software may take on one or more formats prior to installation. Further, some software is provided in a format which is both its source format and its executable format, such as by way of example only, software provided in interpretive languages, such as PERL, and others. Correspondingly, executable code, as used herein, includes any format of the software (e.g., program instructions, data, scripts, control files, parameters, and the like) which is used for execution on a computing device.

Either during the installation of the executable code or shortly after the initial installation of the executable code, a set of executable instructions is run against the distributed executable code to generate a score associated with the executable code. In one embodiment, the score is the result of performing a calculation against the executable code. By way of example only, a calculation which may be used to generate a unique score from the executable code is a checksum calculation. Checksum calculations are well known in the art, and a variety of different calculations may be used, some standard and some ad hoc.

By way of example only, a checksum calculation may be performed by treating the data which comprises the executable code as nothing more than a series of numbers which are adjacent to one another, such that every 16 bits in the executable code is an integer. All numbers are then summed together to generate a total, this total is the score which is associated with the unique executable code. Periodic or random subsequent calculations performed against the executable code, to generate subsequent scores, may then be compared to the initial score generated. Any variation in the initial score to a subsequently generated score will provide an indication that the data associated with the executable code has been altered. Further, it is well known by those skilled in the art that some generation algorithms (e.g., hash algorithms) will perform better than other algorithms (i.e. generate scores with a higher probability for uniqueness). Moreover, it is extremely unlikely that the data associated with the executable code may have been altered and yet still generate the same score as the initial score.

Accordingly, as one skilled in the art will readily appreciate, by comparing a score associated with an initial calculation against periodic or random subsequent calculations, a good indication as to whether the executable code has been altered in anyway may be ascertained. If the executable code has been altered, the alteration may be trapped and recorded. Moreover, the software vendor may be notified electronically that the executable code has been altered in some unauthorized fashion. Further, if alteration is detected the executable code may be disabled or unloaded from the resident memory of the operating system, thereby preventing the effective use of the altered executable code.

In an exemplary embodiment a set of executable code responsible for performing one or more calculations against the executable code resides as one or more low level routines within the operating system. In this way, the execution associated with these instructions will be difficult to detect and alter. Moreover, the calculation or scoring set of executable instructions may be used to validate one or more executable codes. Accordingly, a typical installation script loading a vendor's executable code may check to see if the calculation or scoring set of executable instructions are on the computing device to which installation is desired. If the calculation or scoring set of executable instructions are not available, then the installation script will install them.

Furthermore, distributed executable code may optionally be altered such that it cannot run successfully unless the calculation or scoring set of executable instructions is running within the resident memory of the operating system. In this way, a programmer may not terminate the execution of the calculation or scoring set of executable instructions and then proceed to alter the executable code of the software vendor. Moreover, any manual termination of the calculation or scoring set of executable instructions may be detected and cause the concurrent termination of all executable codes associated with the calculation and scoring set of executable instructions which are being terminated. Thus, a programmer will not easily be able to eliminate the execution of the calculation or scoring set of executable instructions.

FIG. 1 illustrates a flow diagram of one embodiment for a method of validating executable code. Initially a set of executable instructions depicted by FIG. 1 identifies an executable code in step 10 which is to be installed, or was very recently been installed. The data which represents the executable code is read and a calculation, such as a checksum calculation, is performed against the data. The result of the calculation is a score which is acquired in step 20.

The score may then be stored in step 30. Storage may occur in a variety of ways, such that a unique reference to the executable code, with the initially acquired score retrievable both from volatile and non-volatile memory. For example, storage may be temporary in the random access memory (volatile memory) associated with the execution of the executable instructions depicted by FIG. 1, and storage may also be permanent to a computer readable medium, such as a hard disc (internal) or a floppy diskette (external), or others. In this way, should the computing device or operating system housing the executable instructions depicted by FIG. 1 terminate the executable instructions, such as when power is terminated or interrupted in some way, the executable instructions will still be operative to detect the executable code reference and the initial score on a non-volatile computer readable medium when the executable instructions are restarted after power is restored.

In step 50, the calculation performed against the executable code to generate a score is completed periodically or randomly. Moreover, the calculation may be requested manually by another application or by a user. Generating scores randomly or periodically may be configured by the software vendor providing the executable code. Performing operations periodically or randomly are well known in the art and may be implemented within the operation itself or may be initiated by external operations. For example, the executable instructions depicted in FIG. 1 may include logic to read a file having control information, wherein the control information dictates when a calculation is to be performed or initiated against a specific executable code. Alternatively, an external set of executable instructions could be configured to periodically or randomly call a calculation against a specific executable code. By way of example only, two such external sets of executable instructions providing the above referenced utility in the UNIX operating system environment is a "cron" utility and the "at" command.

Once a subsequent score is obtained, the initially generated score associated with the executable code is compared to the newly acquired executable code in step 60. If the scores are not identical, then the executable code has been altered in some way since the initial score was taken. Unauthorized modifications my be reported in step 40 and the owner of the executable code may be notified electronically as well. Some comparisons producing different scores may in fact be authorized by the software vendor. For example, a software vendor may provide bug fixes to the executable code or patches associated with the executable code. In these instances, the user may be required to reinstall the software and the authorized reinstallation will be detectable by the executable instructions of FIG. 1 and a new initial score will be generated and stored with the newly provided executable code. Alternatively, the software vendors may provide files or passwords which permit or interface with the executable instructions of FIG. 1 so as to permit the generation of a new initial score.

If the subsequent score associated with the executable code does not match the initial score and there is no valid authorization detected, then the executable code may be unloaded from the resident memory of the operating system within which it resides, or significant features associated with the executable code may be disabled in step 70. Disabling only certain features may be attractive to the software vendor, since even an unauthorized version may have some independent utility which the vendor wants to permit or exploit. For example an image viewer with editing capabilities may have only the editing functions disabled, while still permitting advertisements and viewing capabilities to be operational for the user.

Figure 2:
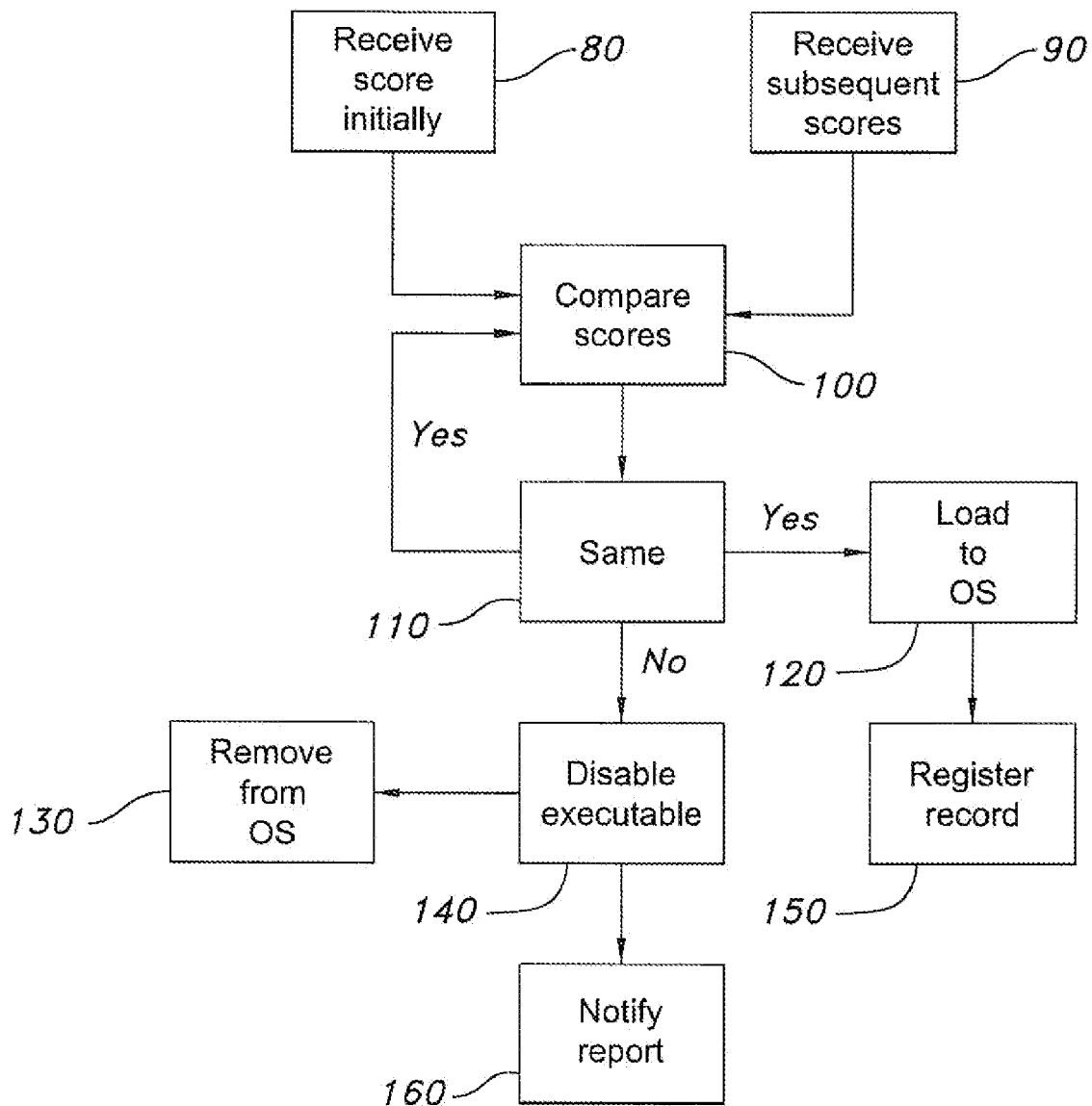
FIG. 2 depicts a flow diagram of a method for disabling executable code which has been altered.

FIG. 2 depicts one method for a flow diagram of a method of disabling executable code which has been altered. Initially a set of executable instructions depicted by FIG. 2 receive a score in step 80 associated with a specific executable code. The initial score is acquired during the loading process of the executable code or shortly thereafter. However, the initial score may be permissibly modified and regenerated if permitted by the software vendor. Such permission may occur in a variety of ways, such as, by way of example only, special tags embedded in the executable code which are detected and associated with vendor authorization, new installation with slight name changes associated with the executable code, passwords supplied by the software vendor, and others.

Once an initial score is obtained, one or more subsequent scores are received in step 90. Each subsequent score is compared in step 100 to detect if the initial score and the subsequent score are the same. If the comparison is the same (step 110), then the executable code associated with the initial score and the subsequent score is permitted to load or remain in the memory of the operating system (step 120) within which it is to execute or is presently executing, and the comparison is recorded and registered to a log or history file in step 150, where it may later be used or audited by the vendor or by utilities provided by the vendor. Such recording may include trapping and saving a variety of system provided variables, such as, by way of example only, user name, date, time, and others.

If the initial score and the subsequent score vary, a determination is made as to whether the variation is a valid condition (e.g. vendor authorized), in which case a new initial score is saved. If the variation in the scores is not valid, the executable code is disabled in step 140. The executable code may also be removed from the operating system's memory in step 130. Unauthorized variations are reported in step 160. Reporting may occur, by way of example only, by electronically notifying the vendor/owner of the software, recording information in a log or history as discussed above, and others.

Figure 3:
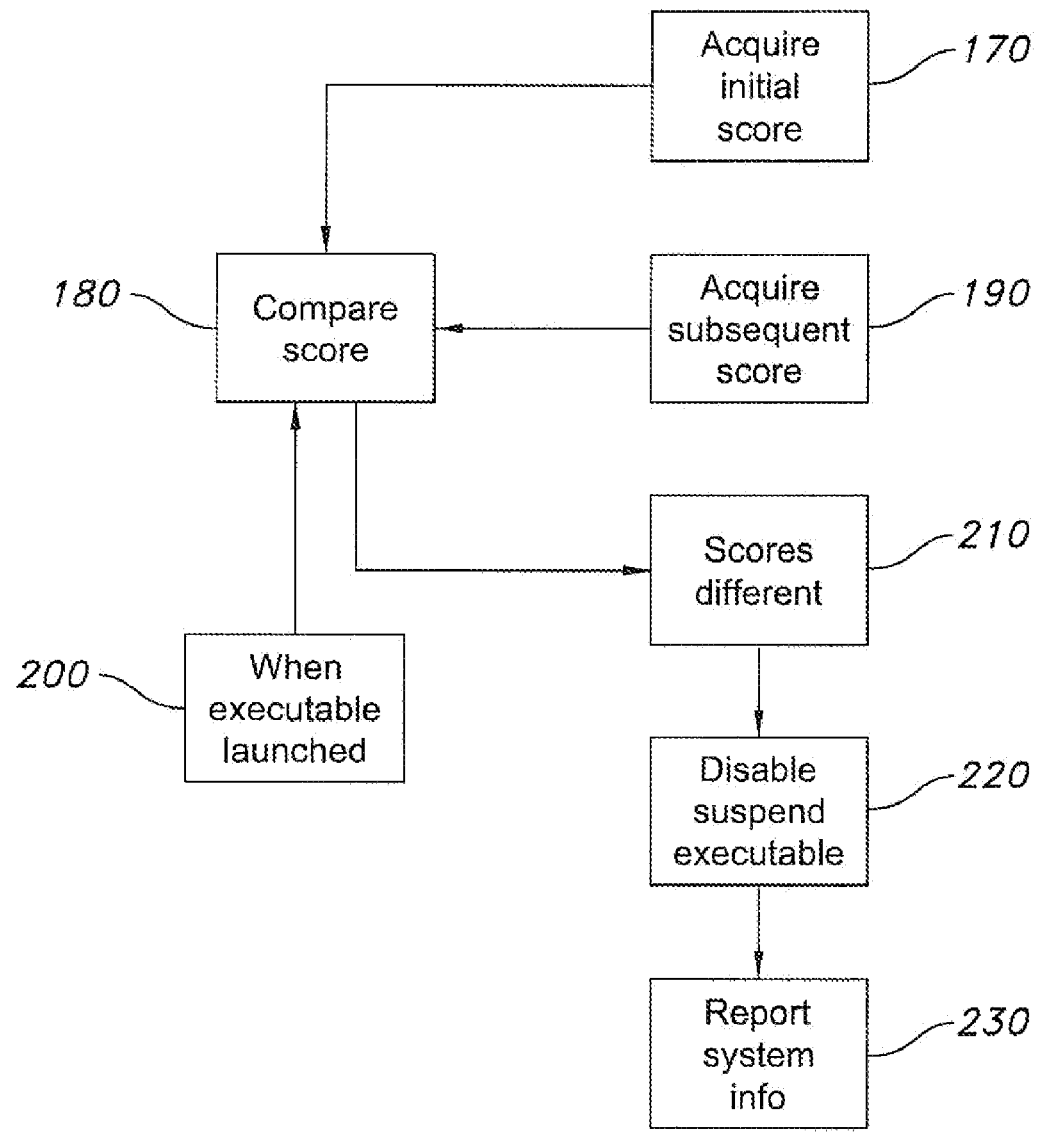
FIG. 3 depicts a flow diagram of a method of authenticating executable code.

FIG. 3 depicts one embodiment for a flow diagram of a method of authenticating executable code. An initial score is acquired in step 170, the score being associated with a specific executable code and acquired by performing a calculation against the executable code when the executable code was initially loaded or shortly thereafter, or if the vendor permitted the modification of the initial score as discussed previously. Moreover, the calculation performed against the executable code, in an exemplary embodiment, is a checksum calculation.

Sometime after an initial score is obtained, one or more subsequent scores are acquired in step 190. In step 180, the initial score and the subsequent scores are compared, and if different (step 210) the executable code is suspended from operation or disabled in step 220, and the failed comparison is reported along with relevant system information (e.g. date, time, user, and others) in step 230. Moreover, comparisons and subsequent scores may be performed each time a user or an application attempts to launch the executable code for use in step 200. In this way, checks against the executable code by generating scores may be obtained every time the code is attempted to be used, periodically, or randomly. Moreover, a combination of comparisons and score generations may occur. For example, a subsequent score may be acquired each time the executable code is launched for use and then may also be acquired randomly or periodically while the executable is in use. In this way, any alteration to the executable code, after its initial launch may be detected while the executable code is in use. As one skilled in the art will readily appreciate, this will permit changes to the image of the executable code to be detected with the executable code is executing.

The foregoing description of an exemplary embodiment of the invention has been presented for purposes of illustration and description. It is not intended to be exhaustive nor to limit the invention to the precise form disclosed. Many alternatives, modifications, and variations will be apparent to those skilled in the art in light of the above teaching. Accordingly, this invention is intended to embrace all alternatives, modifications, and variations that fall within the spirit and broad scope of the attached claims.

What is claimed:

1. A method for validating executable code resident in an operating system having executable instructions, comprising the steps of:

identifying an executable code having an unaltered size;

calculating an initial score associated with the executable code when the executable code is initially or shortly thereafter loaded into an operating system;

saving the initial score;

randomly and substantially each time the executable code is launched for use, calculating a plurality of subsequent scores on the executable code;

exclusively comparing each of the subsequent scores to the saved initial score and to no other scores;

if the each of the subsequent scores do not vary from the saved initial score, concluding the executable code maintains the unaltered size; and if any of the subsequent scores vary from the saved score, concluding the executable code has an altered size.

2. The method of claim 1, further comprising the steps of:

unloading the executable code from the operating system if the saved initial score is not equal to the any of the subsequent scores.

3. The method of claim 1, further comprising the steps of:

disabling at least a portion of the executable code if the saved initial score is not equal to the any of the subsequent scores.

4. The method of claim 1, wherein the scores are the result of a checksum calculation.

5. The method of claim 1, further comprising the steps of:

notifying electronically an owner of the executable code if the saved initial score is not equal to the any of the subsequent scores.

6. A method for disabling executable code which has been modified without authorization having executable instructions, comprising the steps of:

identifying an executable code in an operating system having an unaltered format;

calculating a score associated with the executable code exclusively within an operating system of a computing device independent of a system management mode of operation;

randomly and substantially each time the executable code is launched for use, calculating subsequent scores associated with the executable code;

determining the executable code has an altered format if the score is not equal to any of the subsequent scores, the determining exclusively including comparing each of the subsequent scores to the score with no other score comparisons occurring; and disabling the executable code if the score is not equal to any of the subsequent scores.

7. The method of claim 6, further comprising the steps of:
notifying an owner of the executable code if disabled.

8. The method of claim 6, wherein the scores are the result of a checksum calculation.

9. The method of claim 6, wherein the subsequent scores are further calculated at one or more predetermined time intervals.

10. The method of claim 6, further comprising the steps of:
removing the executable code if disabled from a memory of the operating system wherein the executable code resides.

11. The method of claim 6, further comprising the steps of:
assisting in the loading of the executable code, if not disabled, to a memory of the operating system wherein the executable code resides.

12. The method of claim 6, further comprising the steps of:
registering the executable code if not disabled; and recording a history if the executable code is disabled.

13. A method of authenticating executable code resident in a memory having executable instructions comprising the steps of:
identifying an executable code having an unaltered format;
acquiring a score associated with an executable code which was established when the executable code was first loaded into a memory of an operating system;
randomly and substantially each time the executable code is launched for use after the executable code is said first loaded, receiving subsequent scores on the executable code while the executable code is in the memory;
exclusively comparing the subsequent scores to the score with neither the subsequent scores nor the score being compared to any other values;
if the subsequent scores do not vary from the score, executing the executable code in the unaltered format; and
if any of the subsequent scores vary from the saved score, indicating the executable code has an altered format.

14. The method of claim 13, further comprising the steps of:
disabling the executable code while the executable code is in the memory when the any of the subsequent scores is not equal to the score.

15. The method of claim 13, further comprising the steps of:
suspending one or more operations of the executable code while the executable code is executing in the memory when the any of the subsequent scores is not equal to the score.

16. The method of claim 13, wherein the subsequent scores are received each time the executable code is initiated in the memory for an execution.

17. The method of claim 13, reporting one or more system events and variables when the any of the subsequent scores is not equal to the score.

18. Functional data used to validate executable code embodied in a computer readable medium, the data comprising:
an unaltered original format;
a first score associated with an executable code when the executable code is initially loaded into an operating system;
a plurality of second scores associated with the executable code at 1) a random period of time subsequent to when the executable code was initially loaded and 2) substantially each time the executable code is launched for use subsequent to when the executable code was initially loaded and each second score being operable to be exclusively compared with the first score to determine if the executable code has been altered since the initial load; and
an altered unoriginal format if the first and second scores do not equal.

19. A system for validating executable code, comprising:
an executable code having an unaltered size;
a scoring set of executable instructions operable to receive and record a score associated with the executable code when the code is initially loaded into a computer readable medium;
a comparing set of executable instructions in an operating system of a computing device independent of a system management mode of operation operable to receive subsequent scores associated with the code and to randomly and substantially each time the executable code is launched for use exclusively compare the score and the subsequent scores to determine if the code has been altered; and
an executable code having an altered size if the score and the subsequent scores do not equal.

* * * * *